United States Patent Office 2,906,646
Patented Sept. 29, 1959

2,906,646

FOOD PRESERVING WRAPPING MATERIAL AND PROCESS OF PREPARING THE SAME

Donald P. Smith, Bayside, Joseph Norbert Rollin, Green Bay, and Albert L. James, De Pere, Wis., assignors to Milprint, Inc., Milwaukee, Wis., a corporation of Delaware No Drawing. Application February 15, 1954
Serial No. 410,448

15 Claims. (Cl. 117—144)

This invention relates to a food wrapper material having food preserving properties and to a method of preparing the same and to the process of protecting foods therewith, the wrapper of the invention consisting, more particularly, in a continuous film or foil of pliant material suitable for food wrapping with or without an adherent package sealing layer of thermoplastic substance carrying on the food contacting surfaces thereof a distributed array of spaced, lightly adherently-attached, solid particles of a substance, which particles perform a food preserving function beyond a range exceeding the inter-particle spacing, such material being prepared, if desired, by applying the food preserving substance while conveyed in a volatile liquid vehicle which acts as a solvent for part, and as a slurry matrix for a substantial quantity of small particles of the remainder of the food preserving substance conveyed, which vehicle also may contain in solution, restricted quantities of a bonding resin or gum which aids in attaching the food preserving particles in an exposed and effective condition.

Certain food substances, as for example, cheese, contain substantial quanties of water essential to the texture, flavor and general quality of the food, which, when once removed, may not be replaced to restore the initial values of the food substances. Such foods, because of the presence of water and the nutritional quality thereof, furnish an excellent substrate for mold culture and can be kept, even under refrigeration, for comparatively short periods without ensuing deterioration due to molds, unless special measures are resorted to. If cheese is stored, even under careful refrigerating conditions, with access of atmospheric air thereto, surface mold formation is likely after short intervals and practically inevitable after any substantial period of storage. Oxidation or rancidification may also occur and color stability may be adversely affected by the atmosphere and by exposure to light.

Heretofore, efforts have been made to inhibit and delay deterioration of foods, such as cheese, by complete exclusion of atmospheric air and light, which is feasible only under certain conditions. Another means sometimes used is the direct incorporation within the foodstuff itself of perservative substances, but this approach has certain undesirable dietary consequences, either psychological or real or both. Sometimes special procedures, which deteriorate a portion of the food substance on the exterior surface thereof to form a barrier, to further deterioration, have been resorted to. Other approaches have been attempted wherein an effort is made to maintain a degree of cleanliness during manufacture sufficient to restrict micro-organism inoculation below the level necessary for early establishment of a detectable proliferation. In spite of the availability of these methods, millions of pounds of valuable foodstuffs are lost annually through mold or other micro-organism attack, oxidation or actinic degradation.

The incorporation of fungistatic substances, antioxidants or color stabilizers, directly with the foodstuff has the advantage, where feasible, of giving greater certainty in protection. Heretofore, substances effective for these purposes, as noted above, have been looked upon as dangerous adulteratives when distributed throughout the food in effective concentrations, whether or not any hazard may be factually established. Certain substances recently recognized as effective fungistatics or fungicides have been demonstrated to be harmless for human consumption when contained in fungistatically effective concentrations in foods, but for obvious reasons the reduction of the quantities of these substances used is desirable. The alpha beta unsaturated aliphatic acids including sorbic acid, crotonic acid and hexenoic acid are instances of such substances. In accordance with the theory of enzymatic action in the metabolism of fats, the animal organisms will metabolize such acids in the same way as in the case of caproic acid, which is a six carbon atom, saturated fatty acid, present in butterfat in substantial concentration. The alpha beta unsaturated fatty acids, however, are normal intermediates in the metabolic degradation of saturated fatty acids by molds. The accumulation of an excess of an end product of an enzymatic reaction will inhibit further progress of that reaction. It is believed that when the concentration of alpha beta unsaturated aliphatic acid is artificially increased in cheese, that the enzymatic reaction necessary for propagation of the mold is brought to a halt. It is one of the objects of this invention to provide for the safe and effective preservation of food against mold attack by use of the alpha beta unsaturated fatty acids without distributing the preservative substance throughout the food to be protected.

To bring about an effective preserving action, it is important that the concentration of preserving substance be maintained above certain minimum limits but this need be done only on the surface of the food where deteriorative attack is largely localized. It is the discovery of this invention that a suitable wrapping material for cheese and other food substances may be prepared, bearing a coating of preservative substance on the side of the wrapping material intended to contact the food, and that this coating may be maintained active and effective to produce the necessary surface concentration when applied to the wrapping material in accordance with specific procedures necessary to maintain the activity of the coating.

It is a further discovery of this invention that an effective preservative coating may be applied to food wrapping materials having so-called self-sealing thermoplastic properties, in a manner preserving the activity of the preservative coating without substantial impairment of heat sealing properties, at the same time, engendering antiblocking properties not ordinarily obtainable in a heat sealable wrapping material.

It is a further discovery of this invention that food substances susceptible to attack by growth of microorganisms may be safely stored for protracted intervals without damage by a process which includes the steps of preparing the food under conditions avoiding excessive inoculation, enclosing the food in separate portions in air tight wrapping enclosures from which substantial air inclusions have been eliminated, bringing into contact with the outer surfaces of the food portions a coating of an antibiotic substance in quantity sufficient to exert its full action in the adjacent surface layers of the food portions prior to diffusion into the food substance, and then before the antibiotic substance diffuses into the food to a degree such as to reduce its concentration in the adjacent surface layers below an effective amount, enclosing the food against subsequent inoculation.

In preparing a suitable wrapping material in accordance with this invention, a membrane, foil or film, pliable and of sufficient strength for wrapping purposes is selected. For this purpose, an economical and suitable material has been found in regenerated cellulose film, more commonly called cellophane, of substantial thickness, as for example, 300 gauge, which may carry a closely adherent thermoplastic coating composed in known manner of wax like and rubber like substances with or without customary resin or gum additions or modifiers or plasticizers. Other film like materials such, for example, as chlorinated rubber film, vinyl polymer film or metallic foil may also be employed with or without a backing of thermoplastic material, depending upon the circumstances of use. It is also contemplated that a film possessing thermoplastic self-sealing properties in and of itself and without the addition of any coating of thermoplastic substance may be employed.

Where a film or foil bearing a thermoplastic coating is employed, this coating normally is placed adjacent the surface of the food when wrapped, because of the necessity of bringing adjacent sealing faces into contact when the package is finally closed against air. In preparing the wrapping material of this invention, it is, therefore, desirable to establish a coating of preservative substance, in an effective amount and condition on the surfaces which are expected to be joined by fusion. To accomplish this the material of this invention is prepared by applying to the sheet or film a composition containing the preserving substance, in the form of fine particles suspended in a saturated solution of the substance in a volatile solvent in which the substance is soluble to a substantial degree. The term "solution-slurry" is employed herein to designate such a volatile solvent vehicle carrying in solution, to the point of saturation, a substantial concentration of preservative substance and carrying in suspension an additional substantial quantity of undissolved fine particles of the same substance.

The solution-slurry employed in accordance with this invention may also advantageously carry a small amount of bonding gum or resin say, for example, 1 to 2% of shellac which serves also to improve the dispersion of the undissolved particles and a wetting agent such, for example, as sodium lauryl sulfonate.

Other binders, in higher proportion, particularly if slightly fat or water soluble may be employed to secure a coating having better optical continuity so that better transparency is exhibited. A substance which lends itself to this use is zein. In any case the nature and amount of the binder should be restricted to avoid masking of the preservative employed which is maintained active chiefly through the use of the preservative substance itself, precipitated in situ as the particle attaching medium. The solution-slurry thus prepared may then be rolled coated or otherwise spread upon the surface of the sheet and after application may be rapidly dried by volatilization of the volatile solvent. To assist in transferring the solution-slurry to the surface to be coated, in the quantities desired, an engraved coating roll having on its surface uniformly distributed minute pockets regulated by a doctor knife may be employed.

In a case where an antimycotic or fungistatic preserving action is desired, a wrapped suitable for the purpose may be prepared in accordance with this invention, in such form that the bulk of the preserving substance is located on the surface of the wrapper material in active and effective condition and amount. This is an contrast to wrapper material as formerly prepared from such substances in which the preserving substance has been applied by dipping a bibulous paper into a solution of the preserving substance which saturates or permeates the paper. Wrapper material thus prepared sequesters the bulk of the preservative and an active and effective amount thereof is not exposed on the surface. In a specific instance, an alpha beta unsaturated fatty acid or a salt, ester or other derivative thereof having the formula $$R'-\overset{R}{\underset{|}{C}}=\overset{R}{\underset{|}{C}}-COOX$$

wherein R represents hydrogen or an alkyl group, R' represents an aliphatic radical, and X represents hydrogen or an element or radical capable of forming a salt or ester of an acid; may be employed as the mold inhibiting substance. The substances in this group which contain not more than six carbon atoms are preferred. Among these, but not limited thereto are the acids (and their esters, salts or derivatives) crotonic (cis and trans), sorbic, alpha hexenoic, beta-ethyl acrylic and dimethyl acrylic. Where one of these, for example, sorbic acid, is employed it is desirable that approximately 2.5 grams of the sorbic acid be applied to each 1,000 square inches of wrapping material. Somewhat larger amounts, say up to 6 grams per 1,000 square inches, or smaller amounts, say as little as 1.5 grams per 1,000 square inches, may also be employed successfully.

Where sorbic acid is employed it may be introduced in fine particle form (in particles as small as 250 mesh or smaller) into a volatile solvent vehicle which will hold from 5% to 20% of sorbic acid in saturated solution. The sorbic acid is introduced, however, in an amount well in excess of that required to saturate the solvent vehicle so that a slurry of fine particles of sorbic acid suspended in a saturated solution thereof is produced. The solvent vehicle preferably is readily volatile and it has been found that aliphatic monohydric alcohols having up to 3 carbon atoms per molecule are among the volatile solvents which will exhibit the desired solvent and volatility properties. For example, propyl alcohol may be used as the solvent vehicle for sorbic acid which is soluble therein to the extent of about 13% at ordinary room temperatures. A slurry-solution made with this vehicle may carry, in addition to that held in solution, a sufficient quantity of sorbic acid to raise the total sorbic acid content to about 20% to 40%. Certain favorable results are obtained where the total concentration of sorbic acid is about 30%. Dispersing, bonding or wetting agents may be incorporated in such a slurry-solution as desired.

Upon removal of the volatile solvent it will be found that the material coated, as above described, carries, upon the surface of the thermoplastic coating, an array of preservative particles each having an attachment area joining them to other particles or to the thermoplastic coating. These areas of attachment are made up of recrystallized preservative substance thrown from solution upon evaporation of the solvent together with any shellac or other bonding gum or resin which may have been employed.

The main part of the preservative particles, however, stand above the surface of the base sheet and are exposed to exert their preservative effect by direct contact, solution and diffusion substantially as effectively as though they were available in neat form for application to the food. The areas of attachment to the film or foil, however, are far from enough to completely mask the surface thereof, which surface, under careful optical inspection, preferably with magnification, will appear exposed between particles or aggregates of particles over a considerable proportion of the sheet.

With the material prepared, as above, any fusible layer of thermoplastic substance disposed beneath the attached particles is exposed sufficiently so that when brought into contact with a like surface at softening temperatures and with pressure applied, will act to engulf and submerge the particles without sufficient modification of the coating to prevent complete and effective sealing and bonding. At the same time, the preservative substances, held on the wrapping surfaces in contact with food wrapped therein is exposed and effective, as noted above, for performing its intended function.

In the case of substances, such as sorbic acid, crotonic acid, hexenoic acid and the like, a certain limited vapor tension is exhibited rendering them effective within a limited range beyond actual physical contact. A similar effect produced by solution in a moist food is evident where solid particles of such preservatives are in physical contact with the surface of a food substance such as cheese. The effective remote action ranges of sorbic acid and similar substances due both to volatilization and diffusion far exceed the spacing between particles which is necessary to produce good heat sealing properties. The wrapper of this invention in contact with a food substance, therefore, may be as thoroughly effective as though a complete and continuous coating of sorbic acid were contained thereon. Such a complete and continuous coating, however, would completely mask a thermoplastic self-sealing sheet and thus would remove the possibility of employing a method of closure which is of great importance if not essential to the practical requirements of commercial food wrapping.

While sorbic acid and like substances possess the volatilization and diffusion properties above noted, rendering action at a distance effective, the rate of volatilization is extremely slow and for this reason wrapping material prepared in accordance with this invention with sorbic acid and the like is stable to such an extent that such material may be stockpiled for extended periods without fear or loss of effectiveness. Such materials further are little subject to oxidation attack. Where a preservative layer is applied to a wrapping material in accordance with this invention which is of the thermoplastic self-adhering type, a further advantage is obtained, since the blocking tendency of the material under storage is very materially reduced. In fact, where antimycotic or other preservative action is not desired, a means of ensuring antiblocking action is made available by the use of distributed particles of inert non-tacky substances in a sparse layer which will not prevent heat sealing.

There are indications that the antimycotic action of sorbic acid and related substances, when employed in accordance with the methods above described, is, at the outset, fungicidal as well as fungistatic. These indications are consistent with the fact that a completely closed and packaged food parcel, protected in accordance with this invention and stored for a substantial period (in excess of sixty days), under proper refrigeration conditions, will shown no sign of mold deterioration, but if, at the end of this period, the package is perforated so that re-inoculation of the cheese contained can occur, and the package is again closed, the fungistatic effect of the residual sorbic acid held on the interior surface of the wrapping material appears to have been dissipated since mold deterioration will thereafter progress at a fairly rapid rate even though proper refrigerating conditions are maintained. For this reason, it is important, even with antimycotic substance applied to the interior surface of the wrapper, that good packaging practices be observed. Adequate contact between the wrapper and the food parcel contained must be obtained and perforation of the wrapper must be avoided and proper and complete sealing must be provided in the first instance.

One possible explanation for the need of the above precautions is that after a substantial period of time there is a dilution of the sorbic acid or other antimycotic adhering to the exterior surface of the cheese or other food as a result of migration into the body of the food.

It is contemplated, therefore, in accordance with this invention that food be preserved by a method which consists of the steps of enclosing portions of the food in a wrapper prepared as above, under conditions which will avoid concentrated inoculation with deteriorative micro-organisms or their spores. The preservative coating on the wrapper is brought into contact with substantially all of the exterior surface of the food portion at least to the extent that there will be no areas thereof more remote from the coating than the effective preservative range thereof. As a final step the wrapper is impermeably closed either by self-sealing upon itself or by other sealing means which will complete an effective barrier against re-inoculation. Storage under refrigeration to preserve ordinarily will follow as the final step.

Other substances having an inhibiting effect on the growth of mold, and other micro-organisms, such as benzoic acid, fumaric acid, propionic acid, diacetic acid, dehydroacetic acid, and their salts and esters may be employed, when desired, in place of the alpha beta unsaturated acids above named.

Where the preserving effect to be obtained is that of protection against oxidation, such substances as butyl hydroxyanisol or propyl gallate are useful and where both stabilization against oxidation and actinic effect is sought a substance such as ascorbic acid may be employed.

If desired, wrapping material may be prepared in accordance with this invention without resort to the use of a solvent-slurry. Such may be the choice, in those instances where it is feasible to handle the wrapping material under conditions which will not dislodge a more loosely adhering coating of preservative substance. For example, where lower speed hand wrapping or machine operations are employed, it is possible to employ a wrapping material prepared in accordance with this invention by furnishing a backing foil or film upon which there is mechanically distributed dry particles, for example, of sorbic acid, or other suitable antimycotic in a size range of 60 mesh to 160 mesh (U.S. standard screen size). With particle sizes within this range and a slightly tacky surface, adequate coverage with a spaced particle coating sufficiently adherent will result from dusting due to incidental adhesion forces acting upon the very small particles. Adequate quantities of a preservative such as sorbic acid up to 3 grams per 1,000 square inches or higher will easily adhere in this manner on certain plain surfaces as well as on thermoplastic self-sealing coatings, with adequate uncovered space between particles to preserve the sealing and adhering properties of the thermoplastic coating.

Suitable material, prepared without a solvent-slurry vehicle, can be made up by passing a film or sheet of wrapping material to be coated through a dusting box in which agitated air moving at slightly less than conveying velocities holds sorbic acid or other antimycotic powder in a state of imperfect suspension. The particulate material may also be applied without air suspension and if deposited in excess the excess may be removed by gravity or shaking or both to ensure a clean product not unduly dusty to the touch. It is important that the particulate material be of the proper size so that an adequate and effective quantity will adhere with spacing apparent on magnified optical inspection. On the other hand, this spacing must not exceed the preservative range of the substance employed.

The word "impermeable" as used herein means, when applied to a sheet or film, that the sheet or film is free of breaks, pinholes or other leaks through which particles of matter of observable size may pass, and a sheet through which moisture or air will penetrate by diffusion at a restricted rate. Complete exclusion in that neither liquid nor gas may pass through the sheet in any amount, by diffusion or otherwise, is neither necessary for the purposes of this invention nor is such complete exclusion intended by employment of the term "impermeable." Complete exclusion of matter in particle sizes at or about the dimensions of mold spores is, however, necessary or at least highly desirable since any appreciable re-inoculation after an initial period of storage may defeat the protection afforded.

The range over which a preservative substance is effective by reason of volatility or diffusion or both is herein called the "preservative range."

Where an antimycotic or fungistatic wrapper is desired substances other than sorbic acid may be employed, as for example, hexenoic acid, fumaric acid, crotonic acid or their salts or esters being among those preferred. Benzoic acid, fumaric acid and other substances of known antimycotic activity may also be employed. Among these substances are some having a retarding effect upon the proliferation of organisms other than molds. These and other known antibiotic or bacteriostatic substances may be used in certain instance for their preservative action alone or in conjunction with fungistatic agents or antioxidants or color stabilizers or combinations of these.

We claim:

1. In a mold inhibiting wrapper for moist food substances a pliant sheet including a thermoplastic coating consisting of wax and rubber adherently attached to a surface of said sheet, the combination with a plurality of particles of sorbic acid of a size ranging from 250 mesh to 60 mesh distributed over and adherently attached to said coating in quantity insufficient to cover the same, said particles being in spaced array on said sheet in a ratio of from 1.5 grams to 6 grams of sorbic acid per 1,000 square inches of said sheet whereby said thermoplastic coating may flow between said sorbic acid particles to meet and bond with a contiguous surface when heated.

2. The method of manufacturing a fungistatic wrapping sheet which consists in first applying a thermoplastic coating of wax and rubber composition to a regenerated cellulose sheet, then applying to the said thermoplastic coating a slurry-solution consisting of an alcohol containing not more than 3 carbon atoms per molecule as a vehicle carrying fine particles of sorbic acid suspended therein and sorbic acid in saturated solution therein with a small amount of bonding agent in solution therein, and then removing said alcohol by evaporation to precipitate dissolved sorbic acid and said dissolved bonding agent to form a bond between the thermoplastic coating and the dispersed sorbic acid particles to hold the latter on said thermoplastic surface in an exposed and fungistatically effective position.

3. The method of manufacturing a fungistatic wrapping sheet which consists in first applying a heat-sealable wax base coating to a pliant sheet material, then applying to the said coating a solution consisting of a volatile liquid as a vehicle carrying fine particles of an antimycotic substance comprising an alpha beta unsaturated aliphatic carboxylic acid containing not more than six carbon atoms and derivatives thereof suspended therein, and then removing the volatile solvent by evaporation to precipitate the dissolved antimycotic substance in spaced array of particles on said wax base coating in an exposed and fungistatically effective position.

4. The method of manufacturing a fungistatic wrapping sheet which consists in first applying a heat-sealable wax base coating to a pliant sheet material, then applying to the said coating a solution consisting of a volatile liquid as a vehicle carrying fine particles of an antimycotic substance comprising an alpha beta unsaturated aliphatic carboxylic acid and derivatives thereof selected from the groups consisting of crotonic, sorbic and alpha hexenoic acids, their salts and esters suspended therein, and then removing the volatile solvent by evaporation to precipitate the dissolved antimycotic substance in spaced array of particles on said wax base coating in an exposed and fungistatically effective position.

5. The method of manufacturing a fungistatic wrapping sheet which consists in first applying a heat-sealable wax base coating to a pliant sheet material, then applying to the said coating a solution consisting of a volatile solvent as a vehicle for fine particles of an antimycotic substance selected from the group consisting of crotonic, hexenoic, sorbic, beta ethyl acrylic, demethylacrylic, fumaric, benzoic, propionic, dehydroacetic acids, their esters and salts and sodium diacetate suspended therein, and then removing the volatile solvent by evaporation to precipitate the dissolved antimycotic substance in spaced array of particles on said wax base coating in an exposed and fungistatically effective position.

6. The method of manufacturing a fungistatic wrapping sheet which consists in first applying a heat-sealable wax base coating to a pliant sheet material, then applying to the said coating a solution consisting of a volatile solvent as a vehicle for fine particles of an antimycotic substance comprising an alpha beta unsaturated aliphatic carboxylic acid and derivatives thereof selected from the groups consisting of crotonic, sorbic and alpha hexenoic acids, their salts and esters suspended therein, with a small amount of bonding agent in solution therein, and then removing the volatile solvent by evaporation to precipitate the dissolved antimycotic substance and said dissolved bonding agent to form a bond between the thermoplastic coating and the dispersed antimycotic particles to hold the latter on said wax base coating in an exposed and fungistatically effective position.

7. The method of manufacturing a fungistatic wrapping sheet which consists in first applying a heat-sealable wax base coating to a pliant sheet material, then applying to the said coating by means of an engraved transfer coating roll a solution consisting of a volatile solvent as a vehicle carrying fine particles of an antimycotic substance comprising an alpha beta unsaturated aliphatic carboxylic acid and derivatives thereof selected from the groups consisting of crotonic, sorbic and alpha hexenoic acids, their salts and esters suspended therein, and then removing the volatile solvent by evaporation to precipitate the dissolved antimycotic substance in spaced array of particles on said wax base coating in an exposed and fungistatically effective position.

8. The method of manufacturing a fungistatic wrapping sheet which consists in first applying a thermoplastic coating of wax and rubber composition to a regenerated cellulose sheet, then applying to the said coating a slurry-solution consisting of a volatile solvent as a vehicle carrying fine particles of sorbic acid of a size ranging from 250 mesh to 60 mesh suspended therein, and then removing the volatile solvent by evaporation to precipitate the dissolved sorbic acid in spaced array of particles on said thermoplastic coating in an exposed and fungistatically effective position.

9. In a mold inhibiting wrapper for moist food substances a pliant sheet, including a heat-sealable wax base coating adherently attached to a surface of said sheet, the combination with a plurality of particles of sorbic acid of a size ranging from 250 mesh to 60 mesh distributed over and adherently attached to said coating in quantity insufficient to cover the same, said particles being in spaced array on said sheet in a ratio of from 1.5 grams to 6 grams of sorbic acid per 1,000 square inches of said sheet, whereby said wax base coating may flow between said sorbic acid particles to meet and bond with a contiguous surface when heated.

10. In a mold inhibiting wrapper for moist food substances a pliant sheet of regenerated cellulose, including a thermoplastic coating consisting of wax and rubber adherently attached to a surface of said sheet, the combination with a plurality of particles of sorbic acid of a size ranging from 250 mesh to 60 mesh distributed over and adherently attached to said coating in quantity insufficient to cover the same, said particles being in spaced array on said sheet in a ratio of from 1.5 grams to 6 grams of sorbic acid per 1,000 square inches of said sheet, whereby said thermoplastic coating may flow between said sorbic acid particles to meet and bond with a contiguous surface when heated.

11. In a mold inhibiting wrapper for moist food substances a pliant sheet, including a heat-sealable wax base coating adherently attached to a surface of said sheet, the combination with a plurality of particles of sorbic acid distributed over and adherently attached to said coating in quantity insufficient to cover the same and in spaced array on said sheet in a ratio of from 1.5 grams to 6 grams of sorbic acid per 1,000 square inches of said sheet, whereby said coating may flow between said sorbic acid particles to meet and bond with a contiguous surface when heated.

12. In a mold inhibiting wrapper for moist food substances a pliant sheet, including a heat-sealable wax base coating adherently attached to a surface of said sheet, the combination with a plurality of particles of sorbic acid of a size ranging from 250 mesh to 60 mesh distributed over and adherently attached to said coating in quantity insufficient to cover the same, said particles being in spaced array on said sheet in a ratio of from 1.5 grams to 6 grams of sorbic acid per 1,000 square inches of said sheet, said particles being adherently attached to the surface of said coating by a small quantity of sorbic acid and a bonding substance precipitated from solution in the presence of said particles and the surface of said thermoplastic coating, whereby said wax base coating may flow between said sorbic acid particles to meet and bond with a contiguous surface when heated.

13. In a mold inhibiting wrapper for moist food substances a pliant sheet, including a heat-sealable wax base coating adherently attached to a surface of said sheet, the combination with a plurality of particles in spaced array of a solid antimycotic substance comprising of an alpha beta unsaturated aliphatic carboxylic acid containing not more than six carbon atoms, said particles being of a size ranging from 250 mesh to 60 mesh distributed over and adherently attached to said coating in quantity insufficient to cover the same, whereby said wax base coating may flow between said antimycotic particles to meet and bond with a contiguous surface when heated.

14. In a mold inhibiting wrapper for moist food substances a pliant sheet, including a heat-sealable wax base coating adherently attached to a surface of said sheet, the combination with a plurality of particles in spaced array of a solid antimycotic substance comprising an alpha beta unsaturated aliphatic carboxylic acid and derivative thereof selected from the group consisting of crotonic, sorbic and alpha hexenoic acids, their salts and esters, said particles being of a size ranging from 250 mesh to 60 mesh distributed over and adherently attached to said coating in quantity insufficient to cover the same, whereby said wax base coating may flow between said antimycotic particles to meet and bond with a contiguous surface when heated.

15. In a mold inhibiting wrapper for moist food substances a pliant sheet, including a heat-sealable wax base coating adherently attached to a surface of said sheet, the combination with a plurality of particles in spaced array of a solid antimycotic substance selected from the group consisting of crotonic, hexenoic, sorbic, beta ethyl acrylic, demethylacrylic, fumaric, benzoic, propionic, dehydroacetic acids their esters and salts and sodium diacetate, said particles being of a size ranging from 250 mesh to 60 mesh distributed over and adherently attached to said coating in quantity insufficient to cover the same, whereby said wax base coating may flow between said antimycotic particles to meet and bond with a contiguous surface when heated.

References Cited in the file of this patent

UNITED STATES PATENTS

| | | |
|---|---|---|
| 2,245,499 | Reichel et al. | June 10, 1941 |
| 2,379,294 | Gooding | June 26, 1945 |
| 2,480,010 | Flett | Aug. 23, 1949 |
| 2,574,526 | Borden | Nov. 13, 1951 |
| 2,724,650 | Melnick | Nov. 22, 1955 |

FOREIGN PATENTS

| | | |
|---|---|---|
| 591,820 | Great Britain | Aug. 29, 1947 |

OTHER REFERENCES

"Paper Trade Journal," July 17, 1953, page 34, article entitled New Cheese Wrap Reduces Mold.

"Modern Packaging," December 1953, pages 139 to 141 and 184, article entitled Sorbic Acid as a Mold Inhibitor.

"Food Engineering," August 1953, pages 127 and 151, article entitled New Fungicide.